United States Patent [19]

Shaw et al.

[11] Patent Number: 4,598,384

[45] Date of Patent: Jul. 1, 1986

[54] GRAPHICS DISPLAY WITH IMPROVED WINDOW ORGANIZATION

[75] Inventors: Jerry C. Shaw, Ridgefield; Theodore G. VanKessel, Bethel, both of Conn.

[73] Assignee: International Business Machines Corp., Armonk, N.Y.

[21] Appl. No.: 487,660

[22] Filed: Apr. 22, 1983

[51] Int. Cl.[4] .......................... G06F 3/14; G09G 1/06

[52] U.S. Cl. .................................... 364/900; 340/721; 364/521

[58] Field of Search ... 364/200 MS File, 900 MS File, 364/518, 521; 340/721, 723, 724

[56] References Cited

U.S. PATENT DOCUMENTS

| | | | |
|---|---|---|---|
| 4,197,590 | 4/1980 | Sukonick et al. | 364/900 |
| 4,278,973 | 7/1981 | Hughes et al. | 340/721 |
| 4,412,294 | 10/1983 | Watts et al. | 364/900 X |
| 4,428,065 | 1/1984 | Duvall et al. | 364/900 |
| 4,484,302 | 1/1984 | Cason et al. | 364/900 |

OTHER PUBLICATIONS

D. A. Stockwell, "Display with Partitioned Slow Scroll", *IBM Tech. Disc. Bull.*, vol. 23, No. 4, Sep. 1980, pp. 1512-1513.

Brochure advertising, "The Electric Blackboard Multi-Window Text Editor" from *Santa Criz Software Services,* publication date unknown.

"Datamation", Feb. 1982 issue, p. 198.

*Primary Examiner*—James D. Thomas
*Assistant Examiner*—Thomas Lee
*Attorney, Agent, or Firm*—W. S. Robertson

[57] ABSTRACT

A display system has a driver program for displaying alphanumeric characters and a driver program for displaying graphics. When a graphics window is opened, a program in the operating system establishes a control block containing a code that has been made unique within the user's program. For operations within a window, a function packet is passed to the appropriate driver. The operations are identified by the unique code and several independent windows can be created.

1 Claim, 1 Drawing Figure

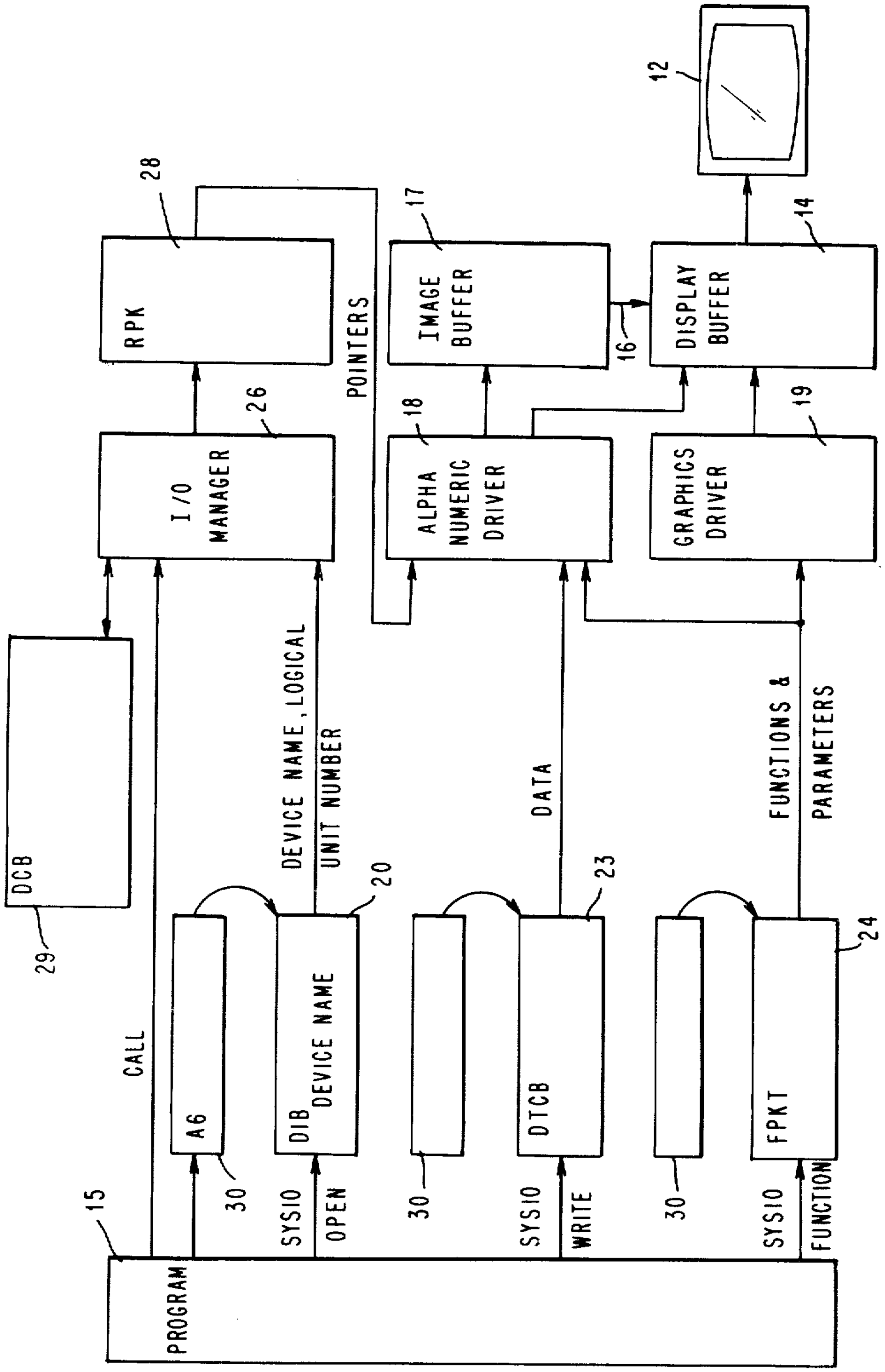
12
28
RPK
POINTERS
17
IMAGE BUFFER
16
DISPLAY BUFFER
14
26
I/O MANAGER
18
ALPHA NUMERIC DRIVER
GRAPHICS DRIVER
19
DCB
29
CALL
DEVICE NAME, LOGICAL UNIT NUMBER
DATA
FUNCTIONS & PARAMETERS
20
23
24
A6
DIB DEVICE NAME
DTCB
FPKT
30
SYSIO
OPEN
WRITE
FUNCTION
15
PROGRAM

GRAPHICS DISPLAY WITH IMPROVED WINDOW ORGANIZATION

FIELD OF THE INVENTION

This invention relates generally to a data processing system of the type having a processor, a processor memory, a display, and means for operating the processor to produce graphics and text on the display. More specifically, this invention relates to a new system for operating the display screen in sections that are called "windows".

RELATED PUBLICATIONS

This invention has been embodied in a data processing system that is described in two publications, "Computer System Operating System Reference Manual Part 1 Operating System" and "Computer System Operating System Reference Manual Part 2 Logical I/0 and System Services", which are available from the assignee of this invention and which are incorporated by reference in this specification. They will be referred to as "Part 1" and "Part 2" respectively.

INTRODUCTION

Displays are widely used in data processing systems and are well known, but it will be helpful to review the features and terminology that particularly apply to this invention and to the system that it has been embodied in.

The display itself is similar to a television set. It has a phosphor coated screen that is excited by an electron beam that sweeps horizontally across the screen in a raster. The raster is formed by a number of horizontal lines and is swept across the tube face, it is gated or blocked by timing circuits so that discrete points on the screen are either illuminated or not illuminated. (These points are also calls pels or pixels.) It may be convenient to use specific numbers for illustration, and in the preferred screen there are 760 points along each line and there are 480 lines. The full 760 by 480 array is used for graphics. For alphanumeric characters, the size is slightly changed to provide 28 character rows that are each 9 lines in height and to give each row 80 character positions that are each 16 points wide.

The pattern of illuminated and non-illuminated points is held in a memory in the processor or in a controller for the display, and it will be convenient to designate a non-illuminated point arbitrarily by a binary 0 to designate an illuminated point by a binary 1. As the beam is swept across the face of the screen, the memory is accessed to provide bits that define a horizontal slice of the pattern. In the system that this invention is used with, a display buffer has a bit for each position on the screen. For graphics, any pattern can be formed in the memory and displayed on the screen. These components of the system are well known and are operated independently of the programs that create a particular dot pattern that is put into the display buffer.

It is conventional to divide the total area of the screen into sub-areas that are called windows. For example, the screen might be divided into an upper half and a lower half to display two different plots of data from an analytical instrument. It is also known to overlap or superimpose windows, for example to present graphics and text together.

Other conventional features of display systems will be introduced later in the description of the preferred system.

SUMMARY OF THE INVENTION

This invention provides a new system for handling the windows of the display. The windows are arranged to be handled like other I/0 devices. This system makes each window independent of other windows and it permits completely independent operations, for example for scrolling. Each window is assigned an identifying code that is unique within a program that creates the window. Control blocks are established and operated to operate several windows simultaneously from one or more application programs. Other features of the invention will be apparent from the following description of the preferred system.

THE DRAWING

The single figure is a block diagram showing components of a conventional display system and the components of this invention.

THE TABLES

Table 1 is a sequence of Pascal programming statements for a program that illustrates the use of the system of this invention.

Table 2 shows the format of a control block Device Initiaiton Block, DIB.

Table 3 shows the format of a control block Function Packet, FPKT.

THE PREFERRED EMBODIMENT—FIG. 1

The drawing shows block diagrams for a display 12, a buffer 14 called a display buffer, a user's program 15, and control blocks and registers and programs of an operating system that are used in an operation to display data from the program. These components will be described in detail later, but it will be helpful to consider first their general organization and function.

The display buffer 14 holds the display data in the direct form of one storage position in the buffer for each point on the screen. A buffer 17 called an image buffer holds multi-bit codes that identify a character to be displayed and its attributes, and the pattern corresponding to each of these characters is fetched from processor or display memory and transferred to display buffer 14 as represented by line 16.

The operations of the image buffer and the display buffer are controlled by an alphanumeric driver 18 and a graphics driver 19 which will be described in detail later. These drivers are programs located in main store (or in a controller store) and are executed by the main processor (or by a display controller engine). Generally, the alphanumeric driver 18 receives data that is to be displayed, and it receives control information in the form of functions that it executes. As an introductory example, operations to establish a window and to make an entry in the window are handled by functions. In executing functions, the alphanumeric driver loads the image buffer and/or the display buffer. The graphics driver receives and executes some but not all of the same functions and it loads the display buffer.

The data to be displayed and the associated control information are formed by user's program 15, as will be described in detail later. The program organizes this information in the form of control blocks and address register pointers to the control blocks. A control block is a region of storage where data is organized in a predefined way that permits the control block to be used by more than one program. The control blocks are given descriptive names for convenience and will be described in detail later. A control block 20 called a Device Initiation block DIB is established when a device is opened, and this block identifies the device that is to be opened and the program associated with the device. In the examples that will be described later, the device is a window in display 12. Another control block 23 called a Data Transfer Control Block DTCB supplies data to the alphanumeric driver 18 but not to the graphics driver 19. The data from the DTCB is in the form of a starting address of the location in processor storage where the data is located and the number of bytes in the location.

A control block 24 is called a Function Packet FPKT. The function packet is a generalized data structure that is used for various kinds of information. The drivers 18 and 19 execute a number of functions that are described in "Part 2" and each function is identified by a numeric code. A function packet is made up of a series of these codes, and a driver executes the functions in sequence. Some functions have parameters, and the parameters for these functions are included in the function packet.

Communications between the program and the drivers are controlled by a program 26 of the operating system that is called the I/0 Manager. The I/0 Manager is called from program 15 when a device is opened or closed and when an I/0 operation is to be performed. The I/0 Manager performs the usual scheduling and dispatching functions and in addition it uses information from the control blocks to prepare a control block 28 called a Request Packet RPK and a control block 29 called a Device Control Block, DCB. The RPK is formed by the I/0 Manager and contains pointers (addresses) to control blocks that are required for an I/0 operation. The DCB contains information for associating a device. (such as a window) with a particular user's task the is supplied to a driver 18 or 19 for an operation.

An address register 30 (specifically address register A6) is loaded with the address of the control block that is to be used in the operation. This register is used for several routines, and in the drawing it is shown separately with control blocks 20, 23, and 24. Other interconnections in FIG. 1 will be explained in the following description of a graphics operation. OPERATION

The Sample User's Program

Table 1 shows a Pascal program that illustrates the operation of this invention. The program opens a window and thereby causes the I/0 Manager to create the control blocks that define the window. The program has statements to draw and "X" in the window and thereby creates function packets that are to be executed by the graphics driver. The program then closes the window. Although the program uses only one window, additional windows are created independently in the same way.

TABLE 1

```
Program Graftest;
Var XW1, XW2, YW1, YW2
XD1, XD2, YD1, YD2: integer;
window: text; 3
Procedure Setwin (var window: text; left, bottom,
right, top);
var lun, errcode: integer;
```

TABLE 1-continued

```
packet: array[0.5] of integer;
begin
lun:= getlun; (@window);
packet [0]:= 1; (* set window boundaries *)
packet [1]:= left;
packet [2]:= bottom;
packet [3]:= right;
packet [4]:= top;
packet [5]:= 0; (* end of packet *)
sysfunc (lun, @packet, errcode);
if errcode ≠ 0 then error (errcode, packet [0];
end;
Procedure Setmap (var window: text;
left, bottom, right,
top: integer);
var lun, errcode: integer;
packet: array[0..5] of integer;
begin
lun:= getlun (@window);
packet [0]:= 21;
packet [1]:= left,
packet [2]:= bottom;
packet [3]:= right;
packet [4]:= top;
packet [5]:= 0;
sysfunc (lun, @packet, errcode);
if errcode = 0 then error (errcode, packet [0]);
end;
Procedure SetMapMod (var window: text; mode:
integer);
var lun, errcode: integer;
packet: array[0..2] of integer;
begin
lun:= getlun (@window);
packet [0]:= 7;
packet [1]:= mode;
packet [2]:= 0;
sysfunc (lun, @packet, errcode);
if errcode = 0 then error(errcode, packet[0]);
end;
Procedure SetVec (var window: text;
X, Y: integer);
var lun, errcode: integer;
packet: array [0..3] of integer;
begin
lun:= getlun (@window);
packet [0]:= 27;
packet [1]:= X;
packet [2]:= Y;
packet [3]:= 0;
sysfunc (lun, @packet, errcode);
if errcode = 0 then error(errcode, packet [0]);
end;
Procedure SetCop (var window: text;
X, Y: integer);
var lun, errcode: integer;
packet: array [0..3] of integer;
begin
lun:= getlun (@window);
packet [0]:= 23;
packet [1]:= X;
packet [2]:= Y;
packet [3]:= 0;
sysfun (lun, @packet, errcode);
if errcode = 0 then error (errcode, packet [0]);
end; (* of procedure SetCop *)
Begin (* program Graftest *)
Reset (window, '#GR'); (* open graphics device *)
XD1:= 100;
XD2:= 600;
YD1:= 100;
YD2:= 400;
SetWin (Window, XD1, YD1, XD2, YD2);
XW1:= 0;
XW2:= 100;
YW1:= 0;
YW2:= 100;
SetMap (Window, XW1, YW1, XW2, YW2);
SetMpMod (window, 2);
SetCop (window, 0, 0);
SetVec (window, 100, 100);
SetCop (window, 0, 100);
```

TABLE 1-continued

```
SetVec (window, 100, 0);
Close (Window);
End.
```

The program follows the general organization of Standard Pascal and will be easy to follow with only a few comments. The first line identifies the routine as a program (in contrast to a procedure) and gives the name of the program, Graftest. The next lines define variables that are used in the main program and/or its procedures. The variables will be described as they appear in the program. Several graphics procedures are listed next. A procedure has the general form of a program and the first line lists the parameters that are passed to the proceedure by a calling routine.

In the main program, the first statement, Reset(Window, '#GR'); is a Standard Pascal procedure to open a device or file for output. The left parameter, window, is the local variable name for the window. The right parameter is the name that the data processing system uses for the device. (The quote marks identify the name as a string to tell the Pascel compiler that it is not a variable or procedure.) The Pascal compiler assigns a logical unit number LUN to the device name, Window. The LUN is an arbitrary number, for example "#1", in the range 1 to 127. It is unique within the program Graftest, but other programs can simultaneously use the same number. If the program Graftest later opens another window, a different name is used—Reset(window2, '#GR');—, and the Pascal compiler assigns a different LUN to the new name. From the Reset statement, the Pascal compiler forms a DIB and forms a macro SYSIO OPEN. The DIB has the form of Table 2 with the name #GR in the field device name and with default entries in the other fields.

TABLE 2

| | | |
|---|---|---|
| DIB | DC.W | |
| DIBVOL | DC.B | Device name |
| DIBDTD | DC.B | Device transmit direction |
| DIBOPT | DC.W | Device configuration options |
| DIBFCN | DC.L | Function packet pointer |

The left column lists the symbolic names that are used by the assembler for these fields. The center column is the assembler statement that creates the field. "DC", "declare constant", is the op code for a conventional assembler instruction to create a storage location with an assigned data value. (The related op code "DS", "declare storage" is used in "Part 2" to illustrate the fields before a value is assigned.) The suffixes B, W, and L for the op code represent a field length of one, two and four bytes respectively. The right column contains comments that describe the field. In this example, the field DIBFCN is set to a default value of a nul pointer, but this field can point to a function packet that is executed as part of the open. The Function packet will be described later.

The macro SYSIO OPEN has the following form: SYSIO OPEN, LUN, DIB, ERROR LABEL. The macro is expanded into the assembler language statements of Table 3.

TABLE 3

| | |
|---|---|
| LEA | EXAMDIB, A6 |
| MOVE.B | #1, D5 |
| TRAP | #6 |
| DC.W | OPEN |

TABLE 3-continued

| | |
|---|---|
| BRA.L | ERRORLAB |

LEA (load effective address) loads the address of the DIB (@PACKET, explained later) into address register A6, as is shown in FIG. 1. MOVE.B (move byte) loads the LUN value, #1, into a data register D5. TRAP is the call to the I/0 Manager which is shown in FIG. 1. DC.W OPEN stores the command OPEN for the I/0 Manager. BRA.L is a branch to a location ERRORLABEL (error label) in case the open is not successful. The error procedure is not specifically relevant to this invention. (Typically, it prints an error message.)

When the I/0 Manager is called, it creates a DCB for this open. The DCB contains the LUN and it contains a pointer to a corresponding PDB in the graphics driver. These control blocks will be described later.

In the four statements after the reset, the program assigns values to variables that identify the window on the screen. In the next line, the variable window and these four parameters are passed to the procedures SetWin. SetWin is the first of several graphics procedures in the program Graftest, and it will be described in detail. The variable window is the program name for the window. Left-bottom is one diagonal cover of the window and it is at pel positions 100,100 on the screen. The right-top variables are 600,400.

"Part 2" lists a number of graphics functions that are performed by the drivers. A function is identified by an integer, and SetWin is function 1. Some functions have parameters, which are also integers, and SetWin has the screen position parameters already described. A function packet is a sequence of functions and their parameters. Each function packet ends with function 0 which is coded in assembler language as ENDLIST and has no parameters.

The input parameter WINDOW is the logical unit number. In the first line, @WINDOW is an extension to Standard Pascal that returns the address of WINDOW (instead of the contents of the storage location named WINDOW.) GETLUN(@WINDOW) is a function that uses the address to get the logical unit number at this location, and this logical unit number is assigned to the variable LUN. The variable LUN is used later in the procedure.

The function packet is formed as entries in an array PACKET. The prefixes such as [0] are indexes into the array. These Pascal statements are compiled to form the assembler statements such as DC.W 1, in the way that has been described already for the DIB.

The procedure called Sysfunc is compiled to form the assembler macro SYSIO FUNCTION, LUN, EXAMFPKT, ERRORLABEL. The parameter @PACKET is an address to PACKET, as has already been described. The parameter LUN is from the first line. The paramater ERRORLABEL is similar to the same parameter for SYSIO OPEN.

The macro SYSIO FUNCTION is expanded in the form that has been described for SYSIO OPEN except that the address in register A6 points to the function packet EXAMFPKT, and the DC.W statement has the string FUNCTION (instead of OPEN). The line "END:" shows the end of this procedure.

The other procedures are closely similar to SetWin and create function packets for functions that are described in detail in "Part 2". To continue in the program, the variables XW1, XW2, YW1, YW2 define a user space that will be illustrated later. SetMap creates a function packet for a function that maps or scales the user space into the window space. It is a conventional function that permits windows to be changed with only simple changes to the program. SetMapMod is a related function.

SetCop starts a graphics operation at a designated point in user space (and at the corresponding point on the screen). In this example, the start is at 0,0 in the user space. SetVec draws a vector from the existing location, established a 0,0 by SetCop, to a designated location in user space, 100,100. Thus, we have drawn a line from lower left to upper right. The next line similarly draws a line from upper left to lower right. The last statement closes the window and is compiled as the macro SYSIO CLOSE.

When the program is run, a control block (not shown) is established for the program. The I/O manager creates a control block DCB for each LUN and the DCB has a pointer to the PDB of the appropriate driver. When the I/0 Manager is called as part of a SYSIO FUNCTION, the parameters for the function are passed to the alphanumeric driver or the graphics driver and the function is executed.

Alphanumeric data is sent to the alphanumeric driver by a DTCB. The DTCB contains a pointer to the data to be transferrred and a length indicator. The alphanumeric driver loads the character identifiers into the images buffer for later transfer of the character patterns to the display buffer or it places the pattern directly into the display buffer.

It is a significant feature of this invention that the windows are opened independently. Thus when this system is used with analytical instruments, the display can present several data plots as an example of independent but related windows.

Those skilled in the art will recognize other applications for the invention and modification in the prepared embodiment within the spirit of the invention and the scope of the claims.

Having thus described our invention, what we claim as new, and desire to secure by Letters Patents is:

1. In a data processing system of the type having a display, a buffer memory for holding a pattern to be presented on the display, a processor memory for holding programs of an operating system and user programs, and a processor for executing the programs simultaneously, a system for operating on the display screen within more than one window, an improved system for operating with multiple windows that are independent in sizes and locations comprising, means in the operating system for establishing a plurality of control blocks (DIB) wherein each control block (DIB) contains a parameter (DIBVOL) that identifies a graphic device, such as a window, to be opened with the user program whereby the number of graphic devices to be opened within each user program is dynamically defined by said user program with each user program defining at least two graphic devices, means for establishing for each said window a parameter (LUN) uniquely identifying each said window within each said user program thereby allowing each said window to be independent of other windows within said user program, means (I/0 manager) for establishing for each said window a control block (DCB) containing said identifying parameter (LUN) and containing a pointer to a driver associated with the device to be opened, means for forming for each said window a function packet specifying a predetermined area of the screen as a window for operations identified by said uniquely identifying parameter and other function packets containing one or more functions to be performed within said window and optionally containing parameters, a drvier program including means for fetching from the user program said function packets and means for executing said function packets to provide a display within the window identified by said parameter.

* * * * *